United States Patent
Al-Omari et al.

(10) Patent No.: US 8,670,976 B2
(45) Date of Patent: Mar. 11, 2014

(54) SYSTEM AND METHODS FOR ENCODING AND DECODING MULTI-LINGUAL TEXT IN A MATRIX CODE SYMBOL

(75) Inventors: Hussein K. Al-Omari, Riyadh (SA); Mohammad S. Khorsheed, Riyadh (SA)

(73) Assignee: King Abdulaziz City for Science & Technology, Riyadh (SA)

( * ) Notice: Subject to any disclaimer, the term of this patent is extended or adjusted under 35 U.S.C. 154(b) by 363 days.

(21) Appl. No.: 13/077,827

(22) Filed: Mar. 31, 2011

(65) Prior Publication Data

US 2012/0253786 A1  Oct. 4, 2012

(51) Int. Cl.
 *G06F 17/20* (2006.01)

(52) U.S. Cl.
 USPC ........ 704/8; 235/435; 235/464.01; 235/462.2

(58) Field of Classification Search
 USPC ............... 235/375, 435, 462.11, 494; 341/50; 345/172, 467; 704/8; 705/14.49; 707/769; 715/256
 See application file for complete search history.

(56) References Cited

U.S. PATENT DOCUMENTS

| | | | | |
|---|---|---|---|---|
| 5,811,781 | A * | 9/1998 | Ackley | 235/462.01 |
| 5,870,084 | A * | 2/1999 | Kanungo et al. | 345/551 |
| 5,939,700 | A * | 8/1999 | Ackley | 235/462.01 |
| 6,024,289 | A * | 2/2000 | Ackley | 235/494 |
| 7,319,532 | B2 * | 1/2008 | Oomura et al. | 358/1.11 |
| 7,973,946 | B2 * | 7/2011 | Fay et al. | 358/1.11 |
| 8,308,056 | B2 * | 11/2012 | Millan | 235/375 |
| 2003/0002063 | A1 * | 1/2003 | Oomura et al. | 358/1.11 |
| 2004/0237046 | A1 * | 11/2004 | Burchall et al. | 715/531 |
| 2004/0257591 | A1 * | 12/2004 | Engelman et al. | 358/1.1 |
| 2005/0195171 | A1 * | 9/2005 | Aoki et al. | 345/172 |
| 2007/0176802 | A1 * | 8/2007 | Fay et al. | 341/50 |
| 2007/0211062 | A1 * | 9/2007 | Engelman et al. | 345/467 |
| 2007/0244689 | A1 * | 10/2007 | Degenhardt et al. | 704/8 |
| 2011/0137724 | A1 * | 6/2011 | Ramchandran et al. | 705/14.49 |
| 2012/0091203 | A1 * | 4/2012 | Al-Omari et al. | 235/435 |
| 2012/0091205 | A1 * | 4/2012 | Khorsheed et al. | 235/462.11 |
| 2012/0173565 | A1 * | 7/2012 | Jacobs et al. | 707/769 |

OTHER PUBLICATIONS

H. Kato et al., "2D Barcodes for Mobile Phones", 2005, IEEE, pp. 1-8.*
Michael Paul et al., "Multilingual Mobile-Phone Translation Services for World Travelers", Aug. 2008, pp. 165-168.*

* cited by examiner

*Primary Examiner* — Douglas Godbold
*Assistant Examiner* — Mark Villena
(74) *Attorney, Agent, or Firm* — SV Patent Service (57) ABSTRACT

A method for encoding a multi-lingual text in a matrix code symbol includes receiving a multi-lingual text comprising Latin-based characters in a Latin-based language and non-Latin-based characters in a non-Latin-based language, converting the non-Latin-based characters in the multi-lingual text to index values to produce a pseudo text, and encoding the pseudo text in a matrix-code symbol. The conversion is based on a predefined mapping that converts the Unicode values of the non-Latin-based characters to index values having fewer digits than the corresponding Unicode values of the non-Latin-based characters.

14 Claims, 9 Drawing Sheets

```
~15761587160599 ~157516041604160799 ~15751604158515811605160699
~15751604158515811610160599
Dr. Hussein Al-Omari (~158399. ~158115871610160699
~15751604159316051585161099)
Dr. Mohammad Khorsheed (~158399. ~160515811605158399
~15821608158515881610158399)
~1573160699 ~15881575156999 ~157516041604160799
~15871610159315801576160399  ~16071584157599
~15751604158016071583 99 ~157516041605157816081575159015939
~16041582

| ASCII | Character | ASCII | Character |
|---|---|---|---|
| 32 |  | 54 | 6 |
| 33 | ! | 55 | 7 |
| 34 | " | 56 | 8 |
| 35 | # | 57 | 9 |
| 36 | $ | 58 | : |
| 37 | % | 59 | ; |
| 38 | & | 60 | < |
| 39 | ' | 61 | = |
| 40 | ( | 62 | > |
| 41 | ) | 63 | ? |
| 42 | * | 64 | @ |
| 43 | + | 65 | [ |
| 44 | , | 92 | \ |
| 45 | - | 93 | ] |
| 46 | . | 94 | ^ |
| 47 | / | 95 | _ |
| 48 | 0 | 96 | ` |
| 49 | 1 | 123 | { |
| 50 | 2 | 124 | | |
| 51 | 3 | 125 | } |
| 52 | 4 | 126 | ~ |
| 53 | 5 |  |  |

Figure 3

| Arabic Character | Unicode Value | Numeric Index | Codeword Value | Arabic Character | Unicode Value | Numeric Index | Codeword Value |
|---|---|---|---|---|---|---|---|
| ؛ | 1563 | 00 | 130 | ط | 1591 | 28 | 158 |
|  | 1564 | 01 | 131 | ظ | 1592 | 29 | 159 |
|  | 1565 | 02 | 132 | ع | 1593 | 30 | 160 |
| ٬ | 1566 | 03 | 133 | غ | 1594 | 31 | 161 |
| ؟ | 1567 | 04 | 134 |  | 1595 | 32 | 162 |
|  | 1568 | 05 | 135 |  | 1596 | 33 | 163 |
| ء | 1569 | 06 | 136 |  | 1597 | 34 | 164 |
| آ | 1570 | 07 | 137 |  | 1598 | 35 | 165 |
| أ | 1571 | 08 | 138 |  | 1599 | 36 | 166 |
| ؤ | 1572 | 09 | 139 | ـ | 1600 | 37 | 167 |
| إ | 1573 | 10 | 140 | ف | 1601 | 38 | 168 |
| ئ | 1574 | 11 | 141 | ق | 1602 | 39 | 169 |
| ا | 1575 | 12 | 142 | ك | 1603 | 40 | 170 |
| ب | 1576 | 13 | 143 | ل | 1604 | 41 | 171 |
| ة | 1577 | 14 | 144 | م | 1605 | 42 | 172 |
| ت | 1578 | 15 | 145 | ن | 1606 | 43 | 173 |
| ث | 1579 | 16 | 146 | ه | 1607 | 44 | 174 |
| ج | 1580 | 17 | 147 | و | 1608 | 45 | 175 |
| ح | 1581 | 18 | 148 | ى | 1609 | 46 | 176 |
| خ | 1582 | 19 | 149 | ي | 1610 | 47 | 177 |
| د | 1583 | 20 | 150 | ً | 1611 | 48 | 178 |
| ذ | 1584 | 21 | 151 | ٌ | 1612 | 49 | 179 |
| ر | 1585 | 22 | 152 | ٍ | 1613 | 50 | 180 |
| ز | 1586 | 23 | 153 | َ | 1614 | 51 | 181 |
| س | 1587 | 24 | 154 | ُ | 1615 | 52 | 182 |
| ش | 1588 | 25 | 155 | ِ | 1616 | 53 | 183 |
| ص | 1589 | 26 | 156 | ّ | 1617 | 54 | 184 |
| ض | 1590 | 27 | 157 | ْ | 1618 | 55 | 185 |

Figure 4

```
بـسم الله الـرحمن الـرحيم
Dr. Hussein Al-Omari (د. حسين الـعمري)
Dr. Mohammad Khorsheed (د. محمد خورشيد)
إن شاء الله سيعجبك هذا الجهد المتواضع لخدمة اللغة العربية
أ ب ت ث ج ح خ
```

```
~15761587160599 ~157516041604160799 ~157516041585158116051606
~157516041585158116101605
Dr. Hussein Al-Omari (~158399. ~158158716101606
~1575160415931605158516109)
Dr. Mohammad Khorsheed (~158399. ~160515811605158399
~15821608158515881610158399)
~1573160699 ~15881575156999 ~157516041604160799
~15871610159315801576160399   ~16071584157599
~157516041580160715839 ~157516041605157816081575159015939
~160415821583160515779 ~157516041604159415779
~1575160415931585

```
~13244299 ~1241414499 ~12412218424399 ~12412218474299
Dr. Hussein Al-Omari (~2099. ~1824474399 ~12413042224799)
Dr. Mohammad Khorsheed (~2099. ~4218422099 ~19452225472099)
~104399 ~25120699 ~1241414499 ~24473017134099  ~44211299
~124117442099 ~124142154512273099  ~411920421499 ~124141311499
~1241302213471499
~0899 ~1399 ~1599 ~1699 ~1799 ~1899 ~1999
```

```
~132442 12414144 124122184243 12412218474299
Dr. Hussein Al-Omari (~20. 18244743 124130422247)99
Dr. Mohammad Khorsheed (~20. 42184220 194522254720)99
~1043 251206 12414144 244730171340  442112 1241174420
1241421545122730  4119204214 1241413114 1241302213471499
~08 13 15 16 17 18 1999
```

SYSTEM AND METHODS FOR ENCODING AND DECODING MULTI-LINGUAL TEXT IN A MATRIX CODE SYMBOL

BACKGROUND OF THE INVENTION

The present application relates generally to technologies for encoding and decoding matrix code symbols which comprise multi-lingual text.

Matrix code symbols such as data matrix codes or QR code are widely used for storing text or data. Examples of the matrix codes symbols include two-dimensional (2D) and three-dimensional (3D) matrix codes. The 2D matrix codes are commonly referred as 2D barcodes. In 2D barcode systems, the data is encoded in a matrix of black and white cells which represent "0"s and "1"s. The text and data can be encoded in the matrix using various encoding techniques such as the American Standard Code for Information Interchange (ASCII). ASCII uses a 7-bit encoding scheme to define 128 characters. The ASCII values of English characters are between 000 and 127. Each English character is encoded by one codeword with codeword values ranging from 1 to 128, which are their respective ASCII values plus 1. It takes one byte in ASCII value to represent each English character.

One drawback of the ASCII standard is that it was limited to a single Latin-based language such as English. Unicode was introduced to represent other languages that were difficult to represent using the 128 character set. Unicode supports multilingual computer processing by representing each character with 2 bytes, which consumes a lot of space to represent text in the two dimensional matrix code. Moreover, the amount of information that the 2D data matrix can hold decreases when the text comprises multiple languages such as Arabic and English, or Japanese and French.

There is therefore a need for a method to provide encoding and decoding of bilingual text in matrix code symbols with increased data capacity compared to conventional matrix code techniques.

SUMMARY OF THE INVENTION

In one aspect, the present invention relates to a method for encoding a multi-lingual text in a matrix code symbol. The method includes receiving, by a computer processor, a multi-lingual text comprising Latin-based characters in a Latin-based language and non-Latin-based characters in a non-Latin-based language; converting, by the computer processor, the non-Latin-based characters in the multi-lingual text to index values to produce a pseudo text, wherein the conversion is based on a predefined mapping that converts the Unicode values of the non-Latin-based characters to index values having fewer digits than the corresponding Unicode values of the non-Latin-based characters; and encoding the pseudo text in a matrix-code symbol.

Implementations of the system may include one or more of the following. At least some of the index values can include two digits. At least some of the index values can include three digits. The non-Latin-based language can include Arabic, Urdu, or Farsi. The Latin-based language can include English, French, Spanish, German, or Italian. The method can further include inserting one or more separation markers between the index values of the non-Latin-based characters and the Latin-based characters in the pseudo text. The step of inserting one or more separation markers can include: inserting a first separation marker at the beginning of a non-Latin text comprising non-Latin-based characters in the pseudo text; and inserting a second separation marker at the end of the non-Latin text in the pseudo text. One or more punctuation marks can be common to the non-Latin-based language and the Latin-based language, wherein the one or more punctuation marks are positioned among non-Latin-based characters, wherein the one or more separation markers are not inserted between the one or more punctuation marks and the adjacent non-Latin-based characters. The one or more punctuation marks can include ',' ';', and '?'. The step of encoding can include: encoding the index values in the matrix-code symbol; and converting the Latin-based characters in the pseudo text to Unicode values and ASCII values, which are encoded in the matrix-code symbol.

In another aspect, the present invention relates to method for decoding a matrix code symbol that encodes a multi-lingual text. The method includes decoding, by a computer processor, a matrix-code symbol to extract a pseudo text that includes a Latin-based characters and index values representing non-Latin-based characters, wherein the index values of the non-Latin-based characters have fewer digits than the respective Unicode values of the non-Latin-based characters according to a predefine mapping; and converting the index values in the pseudo text to the non-Latin-based characters according to the predefine mapping to produce a multi-lingual text comprising the Latin-based characters and the non-Latin-based characters.

The method can further include identifying separation markers between the index values for the non-Latin-based characters and the Latin-based characters in the pseudo text before the step of decoding.

In another general aspect, the present invention relates to a system for encoding a multi-lingual text in a matrix code symbol. The system includes a computer storage configured to store a predefined mapping that converts the Unicode values of non-Latin-based characters in a non-Latin-based language to index values having fewer digits than the corresponding Unicode values of the non-Latin-based characters; and one or more computer processors configured to receive a multi-lingual text comprising Latin-based characters in a Latin-based language and non-Latin-based characters in the non-Latin-based language, to convert the non-Latin-based characters in the multi-lingual text to the index values to produce a pseudo text according to the predefine mapping, and to encode the pseudo text in a matrix-code symbol.

Embodiments may include one or more of the following advantages. The present application provides systems and methods for encoding and decoding multi-lingual text in matrix code symbols with significantly increased information capacity and reduced costs. The multi-lingual text contained in the matrix code symbols can include a Latin-based language, such as English and French, and a non-Latin-based language, such as Arabic, Urdu, and Farsi. In some cases, the number of bilingual characters allowed in a matrix code can be increased by more than two times. The disclosed systems and methods are compatible with different matrix-code encoding techniques such as Data Matrix or QR Code.

Although the invention has been particularly shown and described with reference to multiple embodiments, it will be understood by persons skilled in the relevant art that various changes in form and details can be made therein without departing from the spirit and scope of the invention.

BRIEF DESCRIPTION OF THE DRAWINGS

The following drawings, which are incorporated in and form a part of the specification, illustrate embodiments of the present invention and, together with the description, serve to explain the principles of the invention.

DETAILED DESCRIPTION OF THE INVENTION

Figure 1:
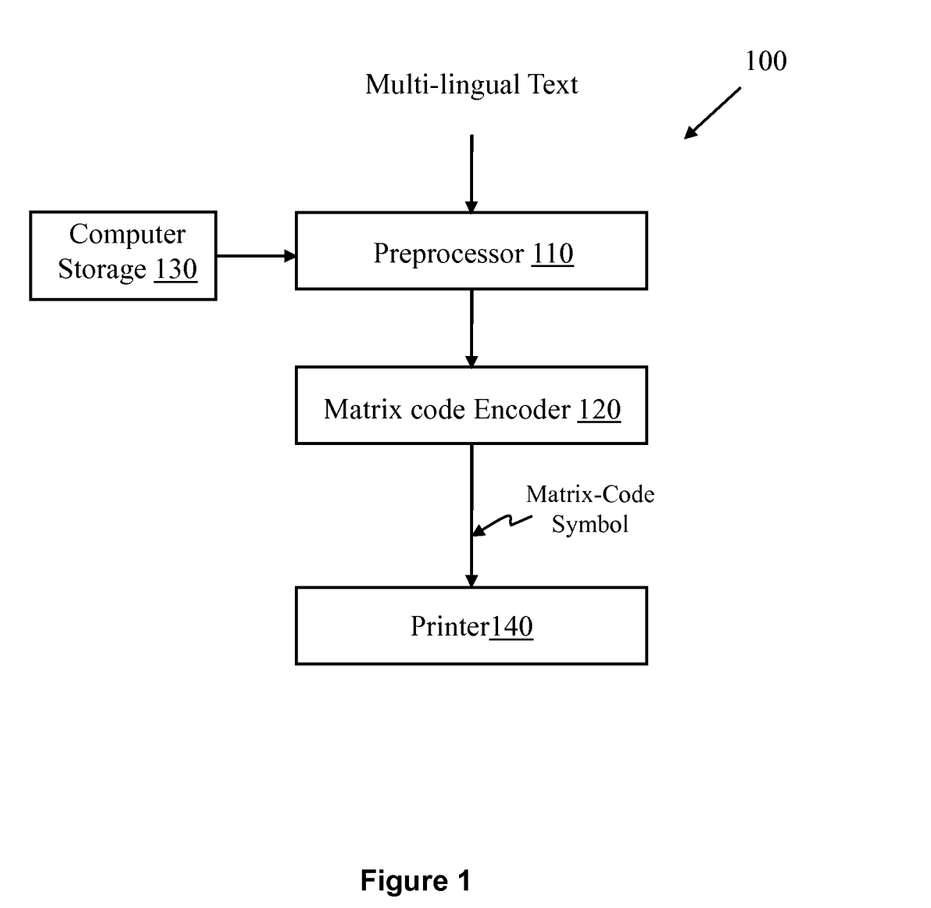
FIG. 1 is a block diagram for an exemplified matrix-code encoding system in accordance with the present invention.

Referring to FIG. 1, a matrix-code encoding system 100 includes a preprocessor 110, a matrix code encoder 120, and a computer storage 130. The preprocessor 110 and the matrix code encoder 120 can be implemented by one or more computer processors. The computer storage 130 stores a predefined mapping for non-Latin-based characters. The preprocessor 110 receives a multi-lingual text, and converts the multi-lingual text into a pseudo text according to the predefined mapping. The pseudo text is received by the matrix code encoder 120, which produces image data for a matrix code symbol that contains information of the multi-lingual text. The matrix-code encoding system 100 can further include a printer 140, which is configured to receive the image data for the matrix code symbol and can print the matrix code symbol on an object.

Figure 2:
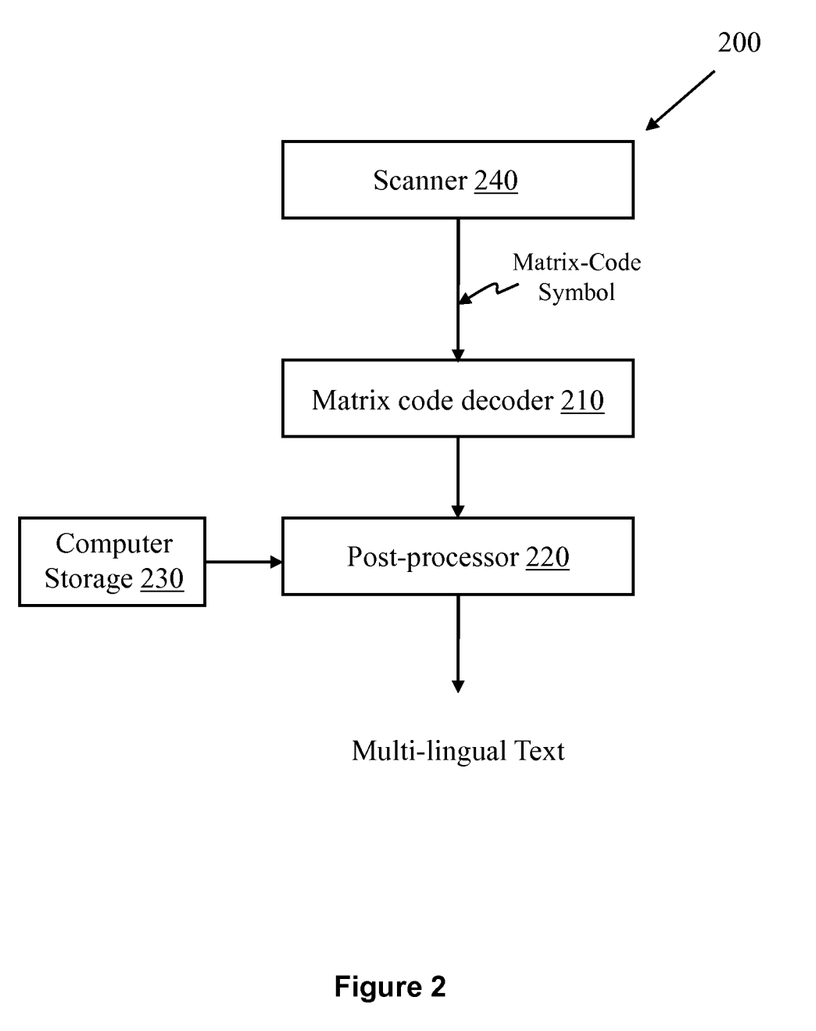
FIG. 2 is a block diagram for an exemplified matrix-code decoding system in accordance with the present invention.

Similarly, for the decoding path, referring to FIG. 2, a matrix-code decoding system 200 includes a matrix code decoder 210, a post-processor 220 and a computer storage 230. The matrix code decoder 210 and the post-processor 220 can be implemented by one or more computer processors. The computer storage 230 stores a predefined mapping for non-Latin-based characters. A matrix code symbol is encoded with information of the multi-lingual text by the matrix code encoding system 100. The matrix code symbol is input to the matrix code decoder 210, which decodes the matrix code symbol into a pseudo text. The post-processor 220 then converts the pseudo text to the multi-lingual text according to the predefined mapping. The matrix-code decoding system 200 can further include a scanner 240 that can retrieve the image of the matrix code symbol on an object and send the image to the matrix code decoder 210.

In the present application, the term and "matrix code symbol" is used to generally refer symbols in a matrix of black and white cells that represent "0"s and "1" to encode text and/or data. The matrix code encoder and decoder in the presently encoding and decoding systems can respectively use techniques compatible with Datamatrix Code, QR Code, 2D barcodes, and 3D barcodes, etc.

Figure 3:
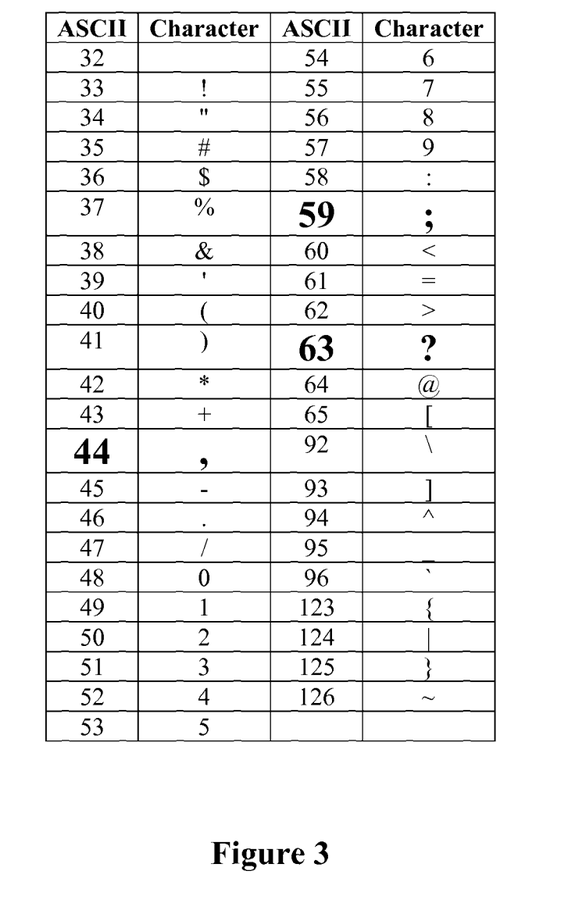
FIG. 3 shows the characters shared between Arabic and English, and the characters' English ASCII values (large boldface ASCII values are for English only).

FIG. 3 shows the printable characters shared between Arabic and English with English ASCII values (large boldface ASCII values are for English only). The printable characters occupy the code words from 33 till 128.

Some no-Latin-based languages such as Arabic, Urdu, and Farsi have characters with high ASCII values. Combining English text with the texts of these languages is space consuming, which results in lower data capacity in the corresponding 2D barcodes in comparison to those comprising characters.

Several techniques are described in detail to improve the information capacity in matrix code symbols for encoding multi-lingual text.

Method 1. Encoding and Decoding Bilingual Text Comprising English and a Non-Latin-Based Language in a Matrix Code Symbol Method 1 is applicable to languages with any number of printable characters. Each character in each of the language is mapped to an ASCII value having an even number of digits. If a character has an odd number of digits, one or more zero digits are added at the left of the ASCII value. After conversion, the number of digits of all characters in the first language should be the same as those of the character of the second language.

Figure 4:
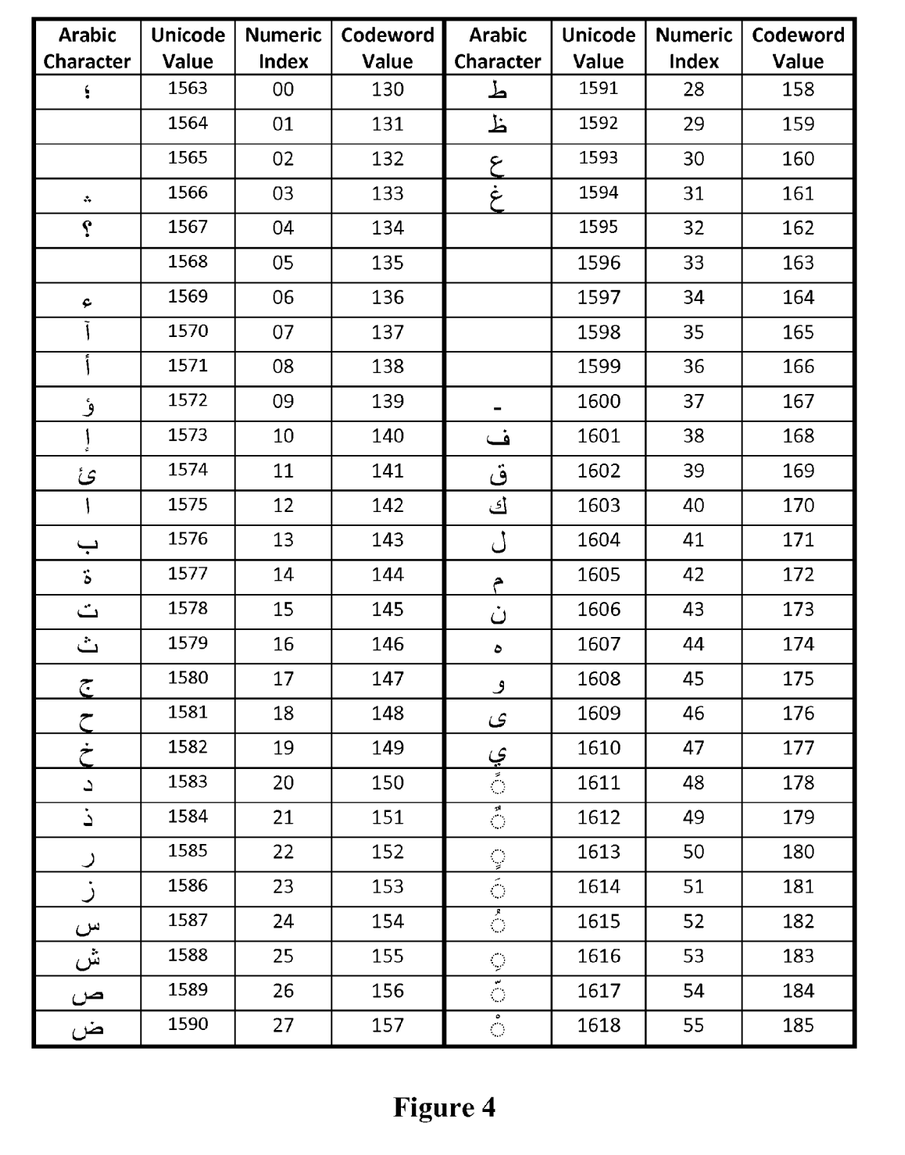
FIG. 4 shows the mapping of Unicode values for Arabic characters into smaller numeric codes (00-99) and codeword values (130-229) used in different methods in the present application.

For example, each Arabic character takes two bytes or two codewords as opposed to one byte or one codeword for English. Referring to FIG. 4, Arabic characters have four-digit Unicode values ranging from 1563 to 1618. The preprocessor 110 (FIG. 1) first maps the Arabic characters are mapped to two-digit numeric index values having values from 00 to 55. Then the preprocessor 110 (FIG. 1) maps each pair of two-digit numeric index values from 00 to 55 to a codeword value between 130 and 229 (00-99 plus 130). The Arabic characters are mapped to three-digit codeword values from 130 to 185. Since the codeword values for the Arabic characters have distinct Unicode values, separation markers are not needed between the codeword values of adjacent Arabic characters. The mapping shown in FIG. 4 can be stored in the computer storage 130 (FIG. 1) and the computer storage 230 (FIG. 2).

It should be noted that the language can have more than 55 or more than 100 characters. For example, for a language having 120 characters, the codeword values can be mapped in a range from 130 to 249.

Next, the preprocessor 110 appends a pair of field separation markers at the beginning and the end of the numeric index values converted from the text in the second language. The separation marker can be a tilde '~' character with an ASCII value of 126, or the PAD character with a codeword value of 129. The Arabic text can be marked by a beginning separation marker "~" and an end separation marker "99". The text field for the second language is thus enclosed by the separation markers. The text in the first language (e.g. English) is outside of the separation markers. Thus a pseudo text is created with English characters outside the separation markers and the numeric index values for the Arabic characters inside the separation markers.

Figure 5:
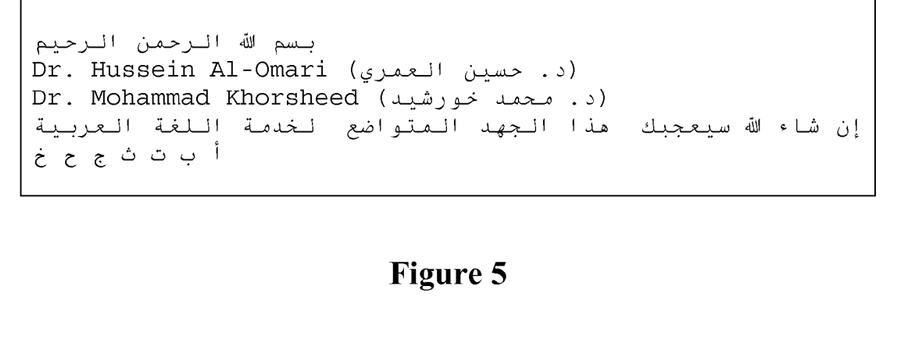
FIG. 5 shows an exemplified Arabic-English bilingual text to be encoded in a matrix code symbol.

An example of an English-Arabic bilingual text is shown in FIG. 5. For comparisons, FIG. 6 shows a Datamatrix symbol created using conventional Unicode representations for the Arabic characters, which has the size of 88×88 cells.

Figure 7:
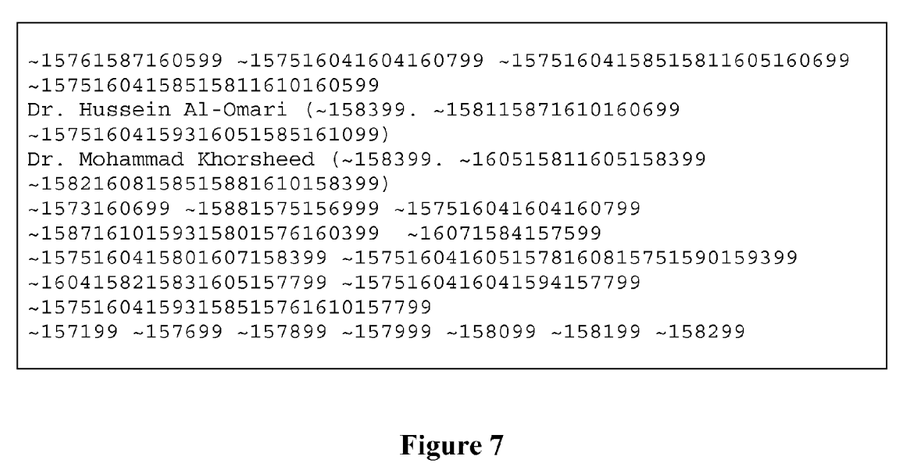
FIG. 7 shows a pseudo text converted from the Arabic-English bilingual text shown in FIG. 5 using a method in accordance with the present invention.

The English-only pseudo text created by the preprocessor 110, shown in FIG. 7, includes a mixture of English characters and the codeword values converted from the Unicode values of the Arabic characters. The Arabic text is marked by a beginning separation marker "~" and an end separation marker "99". The Arabic characters have codeword values between 130 and 229.

Figure 6:
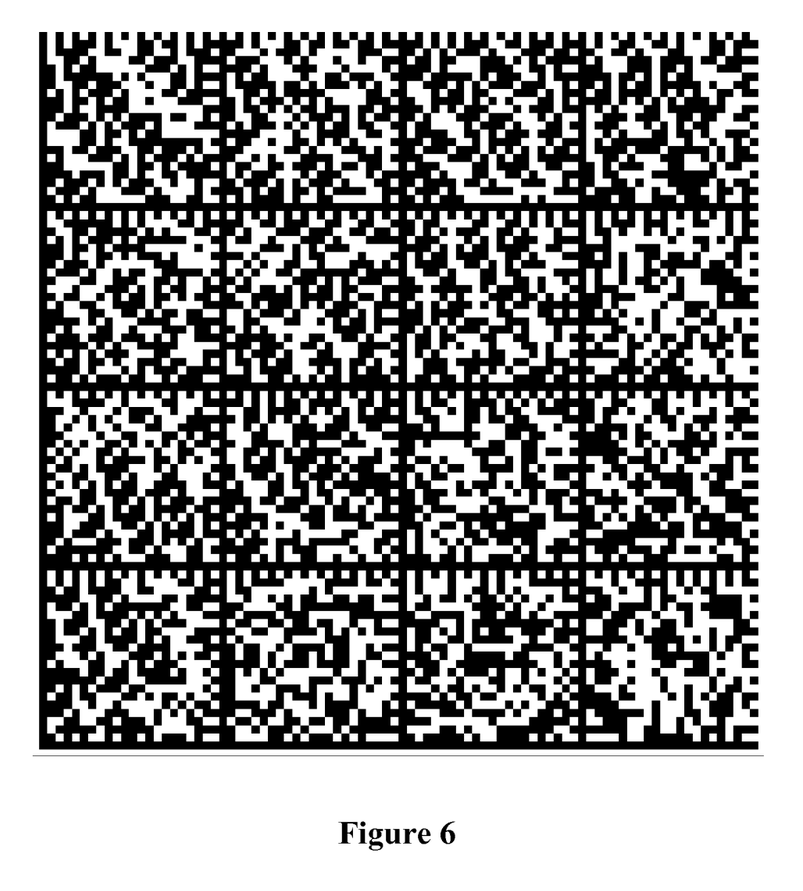
FIG. 6 shows a Datamatrix code symbol produced based on the Arabic-English bilingual text shown in FIG. 5 using by conventional Unicode technique.
Figure 8:
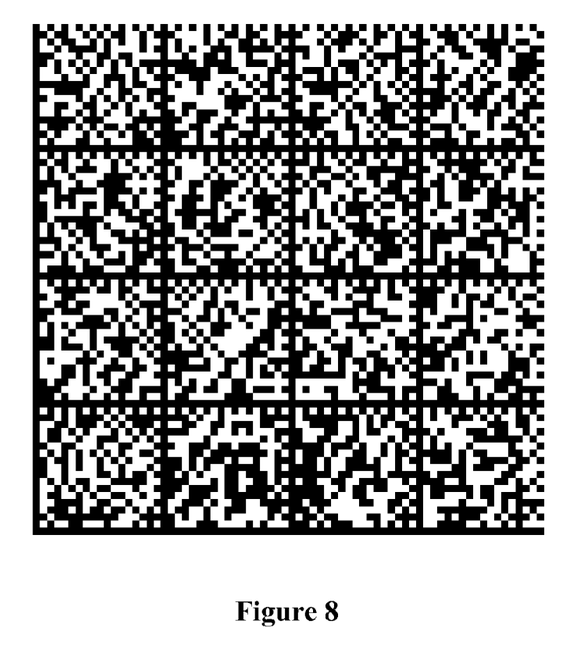
FIG. 8 shows a Datamatrix code symbol produced based on the pseudo text shown in FIG. 7.

The matrix code encoder 120 (FIG. 1) can produce a 72×72 Datamatrix symbol, as shown in FIG. 8, based in the English-only pseudo text in FIG. 6. The Datamatrix symbol encodes the codeword values and the separation markers. The matrix code encoder 120 converts the Latin-based (English) characters in the pseudo text to their respective standard Unicode or ASCII values, and encodes the Unicode or ASCII values in the matrix-code symbol.

Method 1 thus provides space saving and increase information density comparing to the 88×88 Datamatrix symbol in (FIG. 6) encoded by the conventional Datamatrix encoding using standard Unicode values for Arabic characters.

It should be noted that the matrix code encoder 120 (FIG. 2) can use other matrix code encoding techniques (e.g. QR Code, etc.) to produce data matrix symbols. Method 1 can improve information density or reduce symbol size for the same information compared to the respective conventional matrix encoding techniques.

The matrix code decoder 210 (FIG. 2) can decode a matrix code symbol (in FIG. 8) into a pseudo text with codeword values between separation markers (shown in FIG. 7) and English Unicode values outside the separation markers. The post processor 220 (FIG. 2) can identify these separation markers and convert the codeword values (ranging from 130 to 229) between the separation markers into Arabic characters (shown in FIG. 5). The post processor 220 (FIG. 2) can convert the ASCII or Unicode values outside of the separation markers using conventional ASCII indices for English characters.

Method 2. A More Space-Efficient Method for Encoding and Decoding Bilingual Text Comprising English and a Non-Latin-Based Language in a Matrix Code Symbol If the second language has fewer than 100 characters, the characters of the second language can be mapped to two-digit numeric index values ranging from 00 to 99 without the need of converting them to three-digit codeword values.

Similar to the Method 1, as shown in FIG. 4, Arabic characters having four-digit Unicode values from 1563 to 1618 are mapped by the preprocessor 110 (FIG. 1) to two-digit numeric index values ranging from 00 to 55. Different from the Method 1, two-digit numeric index values from 00 to 99 are not converted to codeword values between 130 and 229, which save additional space comparing to Method 1.

Next, similar to Method 1, the preprocessor 110 inserts a pair of field separation markers at the beginning and the end of the second language. The separation marker can be a tilde '~' character with an ASCII value of 126, or the PAD character with a codeword value of 129. The Arabic text can be marked by a beginning separation marker "~" and an end separation marker "99". The few digits for the Arabic characters result in spacing savings in the English-only pseudo text.

Figure 9:
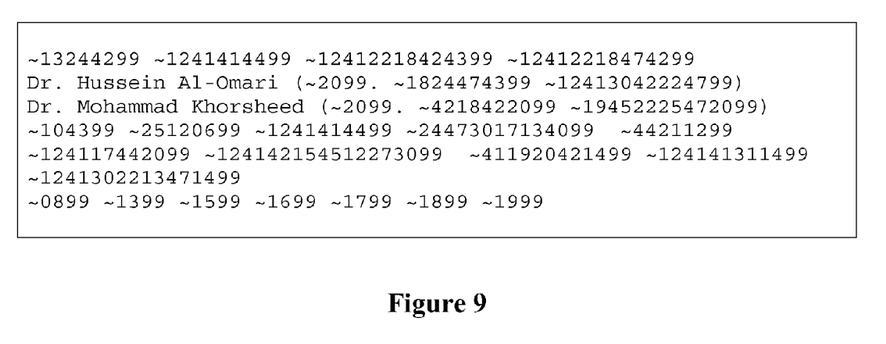
FIG. 9 shows a pseudo text converted from the Arabic-English bilingual text shown in FIG. 5 using another method in accordance with the present invention.
Figure 10:
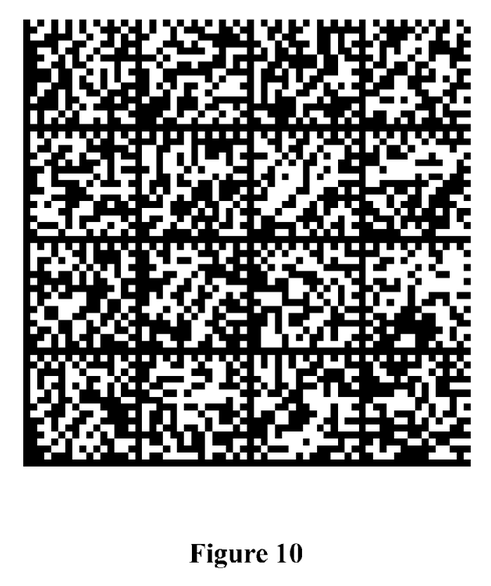
FIG. 10 shows a Datamatrix code symbol produced based on the pseudo text shown in FIG. 9.

For the same English-Arabic bilingual text as input (shown in FIG. 5), the English-only pseudo text created by the preprocessor 110 using Method 2 is shown in FIG. 8, which is markedly shorter than that shown in FIG. 6. The Arabic text is marked by a beginning separation marker "~" and an end separation marker "99". The Arabic characters have numeric index values between 00 and 99. The matrix code encoder 120 (FIG. 1) can produce, based in the English-only pseudo text in FIG. 9, a 64×64 Datamatrix symbol as shown in FIG. 10, which contains the same information but is smaller than the matrix-code symbol in FIG. 7.

Method 2 thus provides additional space saving and higher information density comparing to the 88×88 Datamatrix symbol in (FIG. 6) encoded by the conventional Datamatrix encoding using standard Unicode values for Arabic characters.

Similarly, the matrix code decoder 210 (FIG. 2) can decode a matrix code symbol (in FIG. 10) into the pseudo text with the numeric index values between separation markers (shown in FIG. 9) and English Unicode values outside the separation markers. The post processor 220 (FIG. 2) can identify these separation markers and convert the numeric index values (ranging from 00 to 99) between the separation markers into Arabic characters (shown in FIG. 5). The post processor 220 (FIG. 2) can convert the ASCII or Unicode values outside of the separation markers using conventional ASCII indices for English characters.

As shown, Method 2 improves information density comparing to Method 1 and can provide the same capacity in matrix codes for bilingual text as to matrix codes containing text in a single language.

Method 3. A Space-Optimizing Method for Encoding and Decoding Bilingual Text Comprising English and a Non-Latin-Based Language in a Matrix Code Symbol The methodology applies to mixing English with any language that has a total number of characters less than or equal to 100.

Most of the punctuation marks used in Arabic are the same as in English and have the same ASCII value is in English except for three marks (comma ',' semicolon ';', and question mark "?"). Since Method 2 treats these punctuation marks as English even when they occur between Arabic characters, which results in a pair of start and stop markers for each Arabic text string between the punctuation marks, hence producing a lot of overhead cost.

Method 3 further improves upon Method 2 by reducing these overhead cost, which is applicable to a single non-Latin-based language such as Arabic with Farsi or Urdu, or to a bilingual text comprising English and a non-Latin-based language. In Method 3, if the punctuation marks (i.e. ',' ';', and "?") that are common to Arabic and English occur within an Arabic text, separation markers are not inserted between Arabic characters, which significantly removes overhead costs for separation markers for short Arabic text strings between these common punctuation marks.

Figure 11:
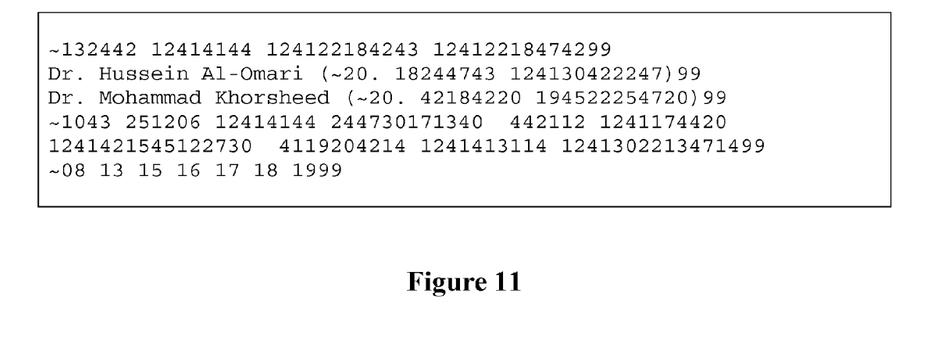
FIG. 11 shows a pseudo text converted from the Arabic-English bilingual text shown in FIG. 5 using yet another method in accordance with the present invention.
Figure 12:
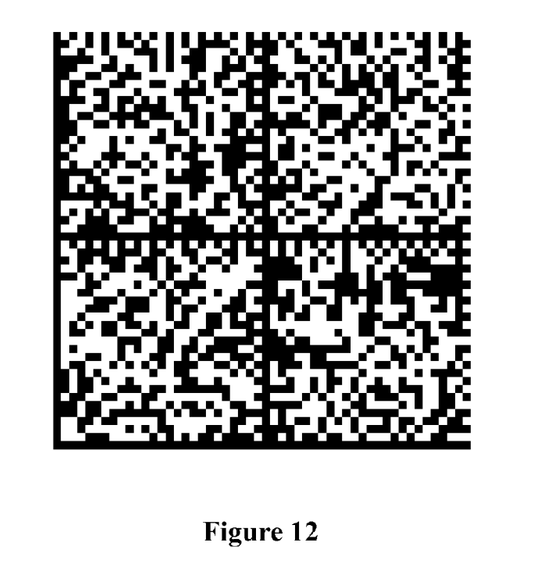
FIG. 12 shows a Datamatrix code symbol produced based on the pseudo text shown in FIG. 11.

For the same English-Arabic bilingual text as input (shown in FIG. 5), the English-only pseudo text created by the preprocessor 110 using Method 3 is shown in FIG. 11, which is shorter than that by Method 2 shown in FIG. 8. The Arabic characters have numeric codes between 00 and 99. The Arabic text is marked by a beginning separation marker "~" and an end separation marker "99", but Arabic text strings are longer because they are not interrupted by the punctuation marks (i.e. ',' ';', and '?'). The matrix code encoder 120 (FIG. 1) can produce, based in the English-only pseudo text in FIG. 10, a (52×52) Datamatrix symbol as shown in FIG. 12, which contains the same information but is smaller than the matrix-code symbol by Method 2 in FIG. 9.

Similarly, the matrix code decoder 210 (FIG. 2) can decode a matrix code symbol (in FIG. 12) into the pseudo text with numeric index values between separation markers (shown in FIG. 11) and English Unicode values outside the separation markers. The post processor 220 (FIG. 2) can identify these separation markers and convert the numeric index values (ranging from 00 to 99) between the separation markers into Arabic characters (shown in FIG. 5). The post processor 220 (FIG. 2) can convert the ASCII or Unicode values outside of the separation markers using conventional ASCII indices for English characters.

As shown, Method 3 improves information density comparing to Method 2 and can provide the higher data capacity in matrix codes for bilingual text even than matrix codes containing text in a single language using conventional methods.

For comparisons, the Datamatrix symbol (shown in FIG. 6) created for the bilingual text in FIG. 5 using conventional Unicode for Arabic characters has 88×88 cells in sizes. It is shown that for the same information content in the bi-lingual text in FIG. 5, the Datamatrix symbols respectively created by Method 1 (72×72 in FIG. 8), Method 2 (64×64 in FIG. 10), and Method 3 (52×52 in FIG. 12) are all smaller than the Datamatrix symbol created by the conventional Unicode technique.

It should be mentioned that Method 3 can give the smaller matrix-code symbols for Arabic/Farsi/Urdu text or a bilingual text. The Latin language can include English, French and other languages.

Figure 13:
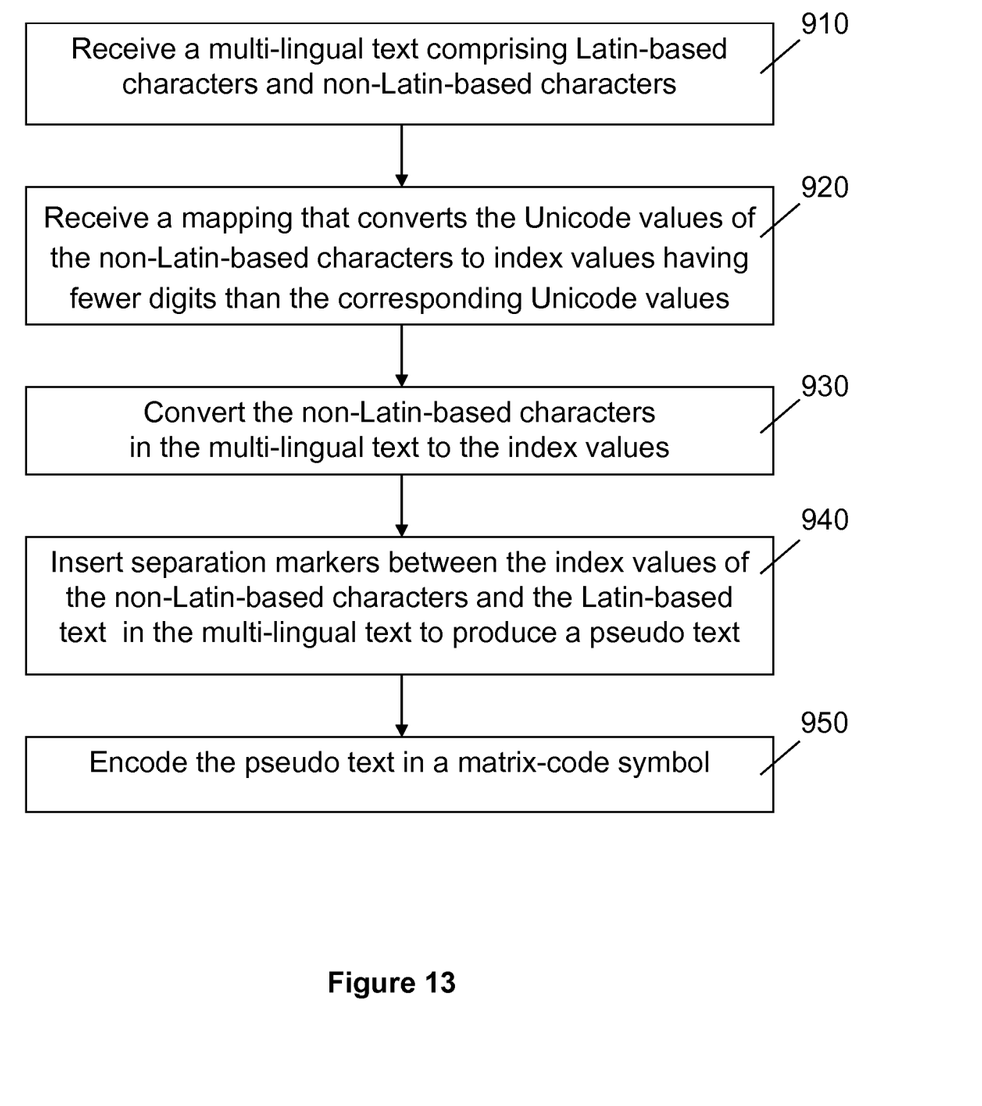
FIG. 13 is a flow diagram of a method for encoding a multi-lingual text comprising a non-Latin-based text in matrix-code symbols.

Referring to FIG. 13, the process of encode a multi-lingual text in a matrix-code symbol can include one or more of the following steps. First, a multi-lingual text is received (step 910). The multi-lingual text can include text in a Latin-based language such as English, French, Spanish, German, Italian, and a non-Latin-based language such as Arabic, Urdu, Farsi, Japanese, Chinese, etc.

A mapping is received (step 920), which specifies a conversion between the Unicode values for the characters in the non-Latin language and pre-defines index values that have fewer digits than the Unicode values for the non-Latin characters. The index values can include the two-digit numeric index values used in Methods 2-3, and the three-digit codeword values in Method 1, which all have fewer digits than the respective Unicode values of the non-Latin characters.

The non-Latin characters in the multi-lingual text are then converted to the index values (step 930) as described above in Methods 1-3.

Separation markers are inserted between the Latin-based text and the index values converted from the non-Latin-based characters (step 940). The separation markers can be added at the beginning and the end of the non-Latin-based text. Furthermore, as described in Method 3 above, separation markers are not needed if the punctuation marks, which are common to the Latin-based language and the non-Latin-based language, appear within the non-Latin-based text. A pseudo text is created, which comprises the Latin-based characters, index values converted from the non-Latin-based characters, and separation markers which separate Latin-based characters and the index values.

A matrix-code symbol is produced based on the pseudo text (step 950), which can use techniques such as Datamatrix Code or QR Code.

For decoding a matrix code symbol encoding a multi-lingual text, the matrix-code decoding system 200 (FIG. 2) the matrix-code symbol and decodes it to extract a pseudo text that includes a Latin-based characters and index values representing non-Latin-based characters according to a pre-define mapping. The index values of the non-Latin-based characters have fewer digits than the respective Unicode values of the non-Latin-based characters. Examples of the index values are the numeric index and codeword values shown in FIG. 4. The post-processor 220 (FIG. 2) can identify separation markers in the pseudo text and convert the index values enclosed by separation markers to non-Latin-based characters by the predefine mapping. The post-processor 220 (FIG. 2) converts the Unicode or ASCII values outside of the separation markers to Latin-based characters, which produces the multi-lingual text encoded in the matrix code symbol.

It should be understood that the above described methods are not limited to the specific examples used. Configurations can vary without deviating from the spirit of the invention. The disclosed methods are applicable to texting in a single non-Latin based language such as Arabic, Urdu, or Farsi. The disclosed methods are also applicable to multi-lingual texting comprising characters in Arabic, Urdu, or Farsi, and English or French, and other non-Latin and Latin based languages.

Furthermore, the disclosed matrix-code symbol encoding systems and methods are compatible with other matrix-code symbol encoding than Datamatrix symbol and QR Code as described above. The English-only pseudo text can be encoded in matrix symbols by other encoding techniques.

What is claimed is:

1. A method for encoding a multi-lingual text in a matrix code symbol, comprising:
receiving, by a computer processor, a multi-lingual text comprising Latin-based characters in a Latin-based language and non-Latin-based characters in a non-Latin-based language;
converting, by the computer processor, the non-Latin-based characters in the multi-lingual text to index values to produce a pseudo text, wherein the Unicode values of each of the non-Latin-based characters are two byte in length, wherein the index values are a single byte in length, wherein the conversion is based on a predefined mapping that converts the Unicode values of the non-Latin-based characters to index values having fewer digits than the corresponding Unicode values of the non-Latin-based characters, wherein the predefined mapping allocates at least 55 consecutive digital numbers for the index values;
inserting the pseudo text into the multi-lingual text in co-existence with the Latin-based characters in a Latin-based language; and
encoding the pseudo text and the Latin-based characters in a Latin-based language in a matrix-code symbol.

2. The method of claim 1, wherein at least some of the index values comprise two digits.

3. The method of claim 1, wherein at least some of the index values comprise three digits.

4. The method of claim 1, wherein the non-Latin-based language comprises Arabic, Urdu, or Farsi.

5. The method of claim 1, wherein the Latin-based language comprises English, French, Spanish, German, or Italian.

6. The method of claim 1, further comprising:
inserting one or more separation markers between the index values of the non-Latin-based characters and the Latin-based characters in the pseudo text.

7. The method of claim 6, wherein the step of inserting one or more separation markers comprises:
inserting a first separation marker at the beginning of a non-Latin text comprising non-Latin-based characters in the pseudo text; and
inserting a second separation marker at the end of the non-Latin text in the pseudo text.

8. The method of claim 6, wherein one or more punctuation marks are common to the non-Latin-based language and the Latin-based language, wherein the one or more punctuation marks are positioned among non-Latin-based characters, wherein the one or more separation markers are not inserted between the one or more punctuation marks and the adjacent non-Latin-based characters.

9. The method of claim 8, wherein the one or more punctuation marks comprise ',' ';', and '?'.

10. The method of claim 1, wherein the step of encoding comprises:
   encoding the index values in the matrix-code symbol; and
   converting the Latin-based characters in the pseudo text to Unicode values and ASCII values, which are encoded in the matrix-code symbol.

11. A system for encoding a multi-lingual text in a matrix code symbol, comprising:
   a computer storage configured to store a predefined mapping that converts the Unicode values of non-Latin-based characters in a non-Latin-based language to index values having fewer digits than the corresponding Unicode values of the non-Latin-based characters, wherein the Unicode values of each of the non-Latin-based characters are two byte in length, wherein the index values are a single byte in length, wherein the predefined mapping allocates at least 55 consecutive digital numbers for the index values; and
   one or more computer processors configured to receive a multi-lingual text comprising Latin-based characters in a Latin-based language and non-Latin-based characters in the non-Latin-based language, to convert the non-Latin-based characters in the multi-lingual text to the index values to produce a pseudo text according to the predefine mapping, to insert the pseudo text into the multi-lingual text in co-existence with the Latin-based characters in a Latin-based language, and to encode the pseudo text and the Latin-based characters in a Latin-based language in a matrix-code symbol.

12. The system of claim 11, wherein the non-Latin-based language comprises Arabic, Urdu, or Farsi, wherein the Latin-based language comprises English, French, Spanish, German, or Italian.

13. The system of claim 11, wherein the one or more computer processors are configured to insert one or more separation markers between the index values of the non-Latin-based characters and the Latin-based characters in the pseudo text.

14. The system of claim 11, further comprising:
   a printer configured to print the matrix-code symbol on an object.

* * * * *